(12) United States Patent
Okada et al.

(10) Patent No.: US 6,541,880 B2
(45) Date of Patent: Apr. 1, 2003

(54) LINEAR MOTOR

(75) Inventors: Takashi Okada, Hitachi (JP); Kim Houng Joong, Hitachi (JP); Kazuo Tahara, Hitachi (JP); Kohji Maki, Hitachi (JP); Kouki Yamamoto, Hitachinaka (JP); Miyoshi Takahashi, Hitachi (JP); Kenji Miyata, Hitachinaka (JP); Ryoichi Takahata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 09/793,507

(22) Filed: Feb. 27, 2001

(65) Prior Publication Data

US 2002/0050743 A1 May 2, 2002

(30) Foreign Application Priority Data

Nov. 2, 2000 (JP) ........................................ 2000-340369

(51) Int. Cl.[7] .............................................. H02K 41/03
(52) U.S. Cl. .......................................... 310/12; 318/135
(58) Field of Search ............................. 310/12, 13, 14, 310/91; 318/135

(56) References Cited

U.S. PATENT DOCUMENTS

| 4,808,955 A | * | 2/1989 | Godkin et al. ............... 335/222 |
| 4,945,268 A | * | 7/1990 | Nihei et al. .................... 310/12 |
| 6,157,099 A | * | 12/2000 | Hartman ....................... 310/13 |
| 6,236,124 B1 | * | 5/2001 | Sekiyama et al. ............. 310/12 |
| 6,313,551 B1 | * | 11/2001 | Hazelton ....................... 310/12 |

FOREIGN PATENT DOCUMENTS

| JP | 63-310361 | * | 12/1988 |
| JP | 10174418 | | 12/1996 |
| JP | 11-243676 | * | 9/1999 |

OTHER PUBLICATIONS

English Translation of PCT/JP/00/02808 dtd Apr. 27, 2000, corresponding to U.S. application Ser. No.: 09/959,615.

* cited by examiner

Primary Examiner—Nestor Ramirez
Assistant Examiner—Judson H. Jones
(74) Attorney, Agent, or Firm—Antonelli, Terry, Stout & Kraus, LLP

(57) ABSTRACT

There is provided a linear motor, having an armature and a needle with magnetism, in which the armature has at least a magnetic pole of a first polarity having a first opposed part and another magnetic pole of a second polarity having a second opposed part; the needle is held by the first opposed part, and is further held by the second opposed part; and a distribution of magnetism of the needle according to a position in the movable direction thereof. In this way, a leak of a magnetic flux from pole teeth passing between the pole teeth of the armature is decreased to increase a thrust and braking force of the needle, which is thereby enabled to generate a greater or smaller thrust in a specific section or sections than the thrust during usual linear movement.

6 Claims, 9 Drawing Sheets

711 712 713  721 722 723 724 725 726  714 715 716

721 722 723  711 712 713 714 715 716  724 725 726

LINEAR MOTOR

BACKGROUND OF THE INVENTION

The present invention relates to a linear motor, and more particularly to a linear motor suitable for generating a greater or smaller thrust in a specific section or sections than the thrust generated during usual linear movement.

The linear motor derives from horizontal development of the configuration of a rotary motor, and is available in a variety including the following versions: for example, a linear D.C. motor (unipolar or multipolar), a linear synchronous motor, a linear induction motor and a linear pulse motor. To take up the linear pulse motor as an example, such a prior art linear motor is disclosed in JP-A-63-310361 specification.

Some machines to which the linear motor is applied require a considerably large thrust and braking force, while others do not. Some machines may require considerably large thrust and braking force only in a specific section or sections. Conceivably, such a machine which requires a considerably large thrust and braking force in a specific or sections may use over the whole operation range a linear motor of a structure capable of generating the required thrust and braking force. Where the linear motor itself is incapable of generating the required thrust and braking force, it is conceivable to use in each of such specific sections another special power source to generate the required thrust and braking force.

For instance, as described in JP-A-11-243676 specification , there is a method of using in a specific section or sections a mechanism for generating a greater thrust and braking force than the usual thrust and braking force by providing a mover runner with a slope tapering in its moving direction and the armature core of armature means to have an equal distance from this slope and branching part of a suction force arising between the mover runner and the armature core.

SUMMARY OF THE INVENTION

However, the above-cited example of the prior art requires structuring of a tapered slope in a specific part, i.e. altering the structure only in a specific part, resulting in the possible problem of a higher manufacturing cost.

An object of the present invention is to provide a linear motor capable of generating a greater thrust and braking force in a specific section or sections than the thrust and braking force during usual linear movement.

A characteristic of the present invention is that it is a linear motor having an armature and a needle with magnetism, in which the armature has at least a magnetic pole of a first polarity having a first opposed part and another magnetic pole of a second polarity having a second opposed part; the needle is held by the first opposed part, the needle is further held by the second opposed part; and a magnetic area in the needle is varied only in a prescribed section.

Or there is provided a linear motor having an armature and a needle with magnetism, in which the armature has at least a magnetic pole of a first polarity having a first opposed part and another magnetic pole of a second polarity having a second opposed part; the needle is held by the first opposed part and is further held by the second opposed part; and preferably a magnetic substance is used which permits the magnetism of the needle to vary according to a prescribed section or sections.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Preferred embodiments of the present invention will be described below with reference to the accompanying drawings.

Figure 1:
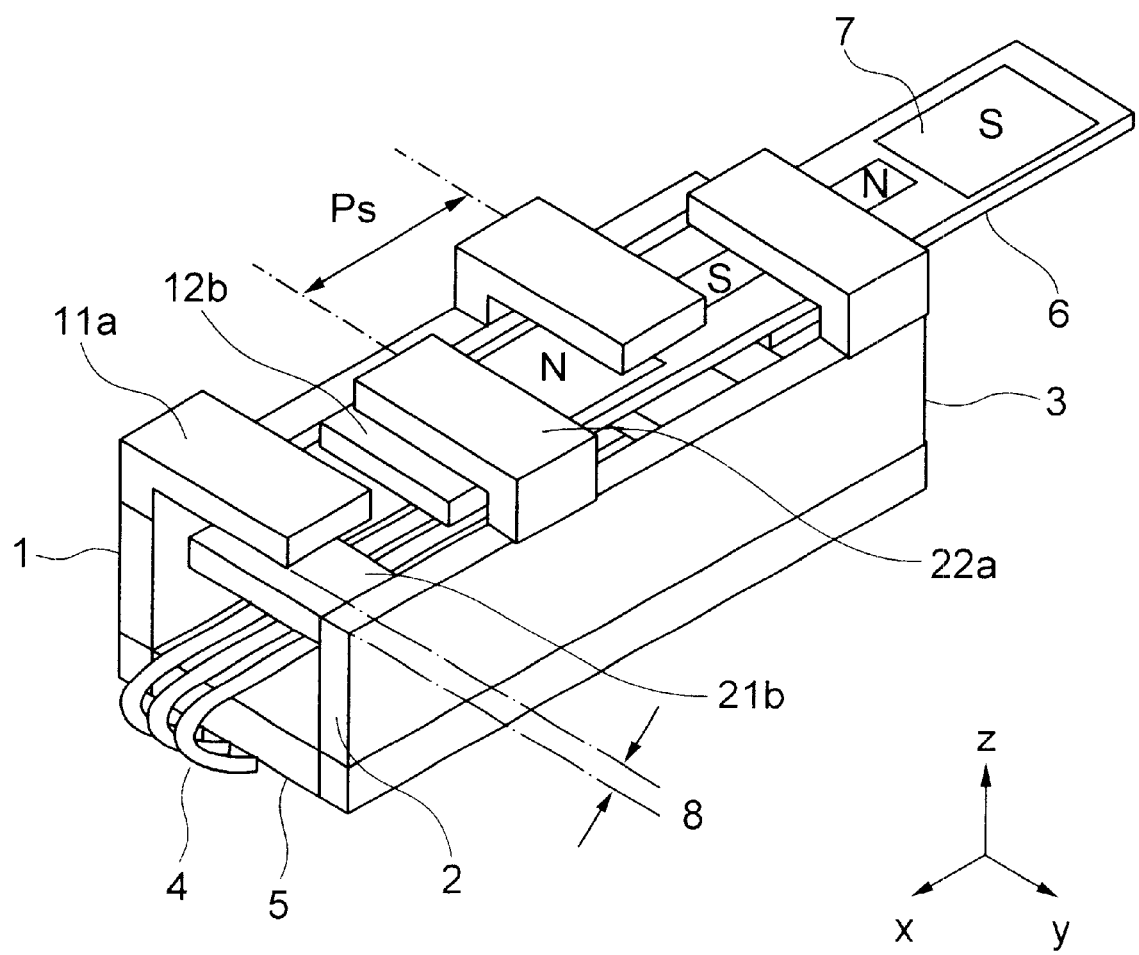
FIG. 1 shows a perspective view of a linear motor according to one embodiment of the present invention.
Figure 2:
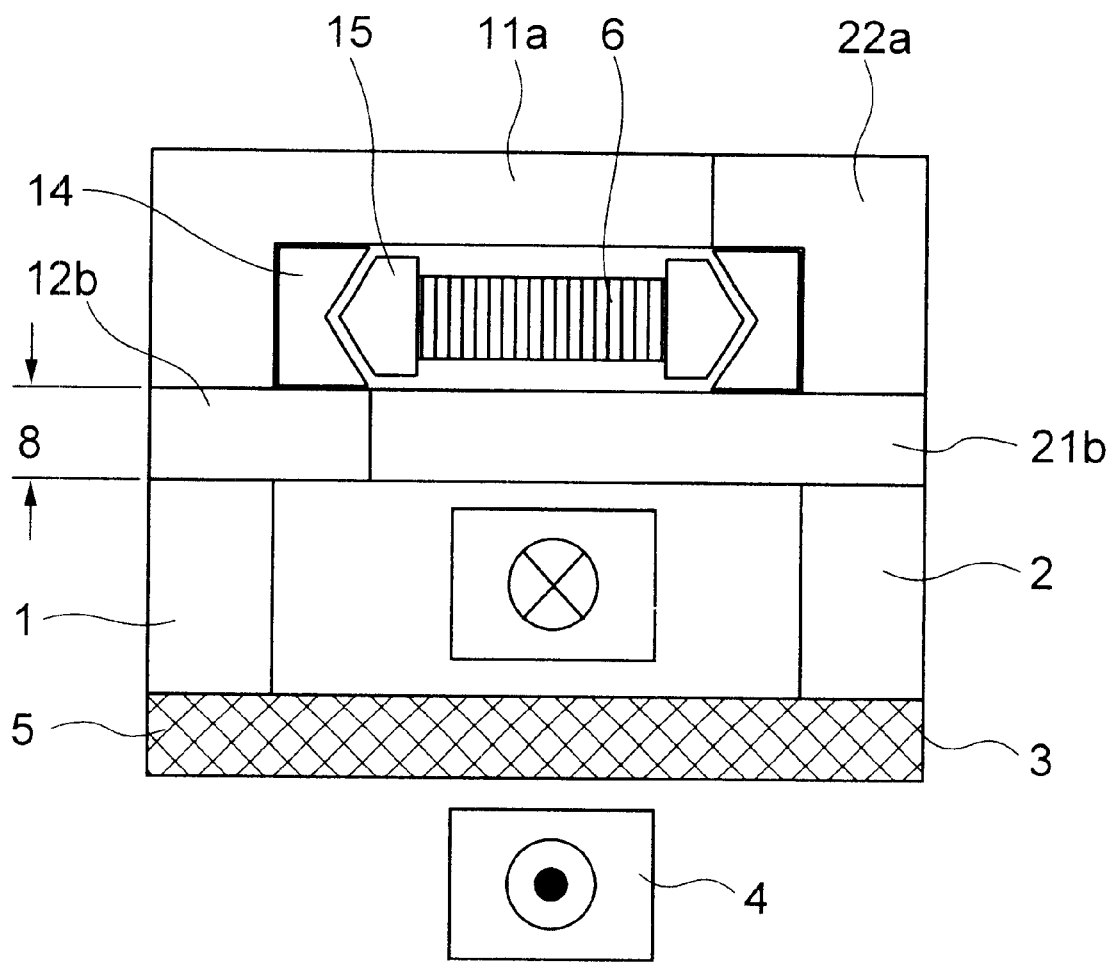
FIG. 2 shows a cross section of the linear motor of FIG. 1.
Figure 2:
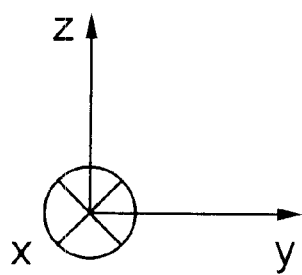
Figure 3:
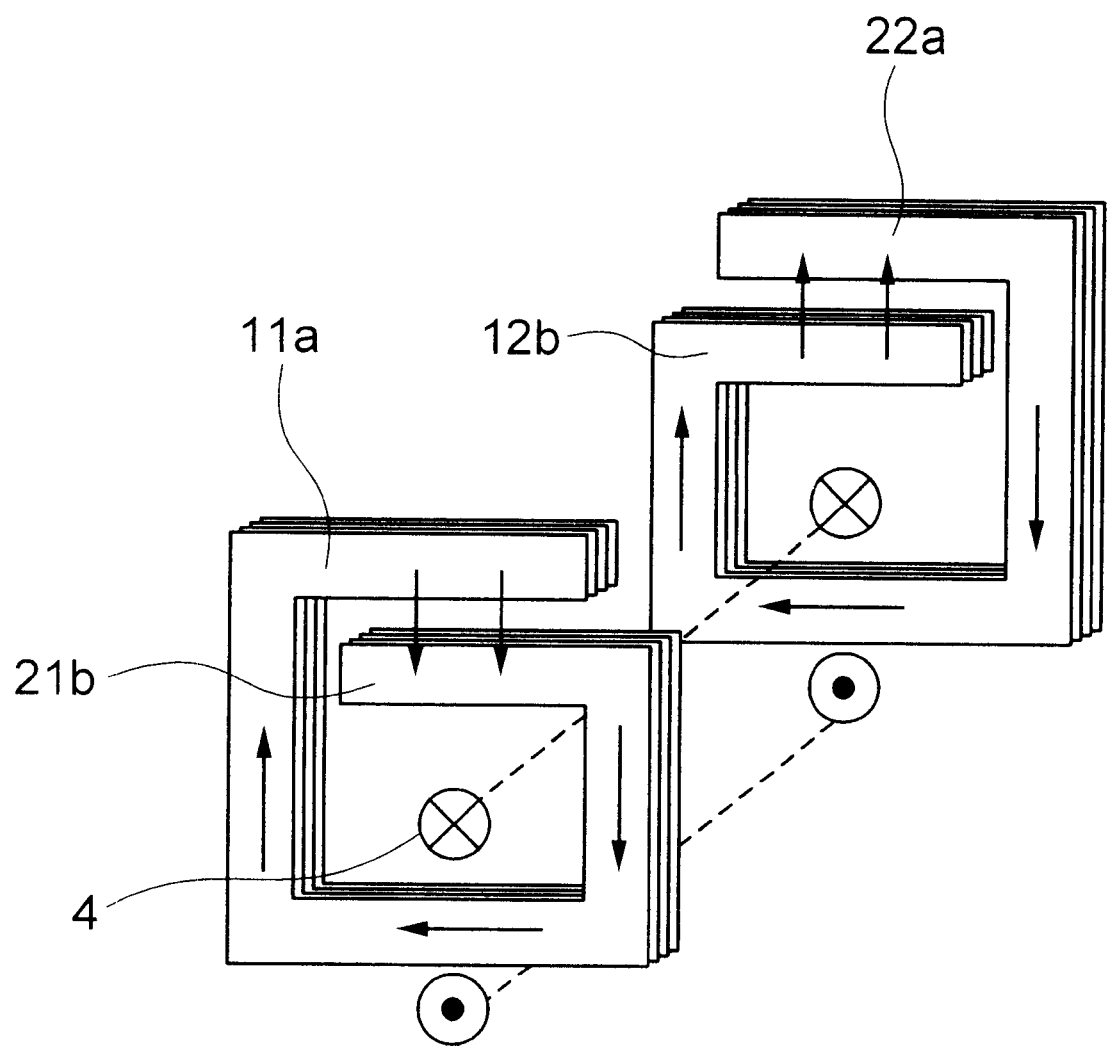
FIG. 3 conceptually shows a flow of a magnetic flux in the linear motor of FIG. 1.

FIG. 1 illustrates a configuration of a linear motor, which is a preferred embodiment of the present invention; its cross section is shown in FIG. 2; and a flow of magnetic flux in this embodiment is conceptually shown in FIG. 3. Further, outlines of the arrangement of permanent magnets to be fitted to a needle 6 shown in FIG. 1 are illustrated in FIGS. 4A and 4B and FIGS. 5A and 5B.

In FIG. 1, reference numeral 1 denotes a magnetic pole; 11a, an upper pole tooth of the magnetic pole 1; 12b, a lower pole tooth of the magnetic pole 1; another magnetic pole; 21b, a lower pole tooth of the magnetic pole 2; 22a, an upper pole tooth of the magnetic pole 2; 3, an armature; 4, an armature coil; 5, an armature core; 6, a needle; 7, a permanent magnet; 8, a gap between the upper pole teeth 11a of the magnetic pole 1 and the lower pole teeth 21b of the magnetic pole 2 (or between the lower pole teeth 12b of the magnetic pole 1 and the upper pole teeth 22a of the magnetic pole 2); and Ps, a pole pitch between the adjoining pole teeth centers of the same pole face. The armature core 5 at the bottom of the armature 3 is flanked with-the magnetic poles 1 and 2, and the thin, long and straight armature core 5 having a U-shaped cross section opening upward is wound around by the armature coil 4 in the lengthwise direction. Thus the armature 3 is provided with two magnetic poles 1 and 2.

The magnetic pole 1 has on its top face the upper pole teeth 11a, the lower pole teeth 12b, . . . projecting toward the magnetic pole 2, and the magnetic pole 2 has on its top face the lower pole teeth 21b, the upper pole teeth 22, . . . projecting toward the magnetic pole 1. Thus, the projecting pole teeth of the magnetic pole 1 are extended alternately at two levels, upper and lower, the (2n−1)th (n=1, 2, 3, . . . ) pole teeth up and the (2n)th (n=1, 2, 3, . . . ) pole teeth down. As opposed to the magnetic pole 1, the projecting pole teeth of the magnetic pole 2 are also extended alternately at two levels, upper and lower, the (2n−1)th (n=1, 2, 3, . . . ) pole teeth down and the (2n)th (n=1, 2, 3, . . . ) pole teeth up. All the upper pole teeth of the magnetic pole 1 and the magnetic pole 2 being defined collectively as an upper pole face and all the lower pole teeth of the same collectively as a lower pole face, the structure is such that there are two pole faces, upper and lower, in each of which mutually opposite pole teeth of the magnetic pole 1 and the magnetic pole 2 mesh with each other.

Hereupon, the first upper pole teeth 11a and lower pole teeth 21b are defined as a first opposed part, and the second lower pole teeth 12b and upper pole teeth 22a as a second opposed part. Consequently, the armature structure is such that the (2n−1)th pole teeth constitute the first opposed part, and the (2n)th pole teeth constitute the second opposed part.

Further, as the fixed gap 8 is provided between the upper pole teeth and the lower pole teeth of each opposed part and the needle having magnetism is passed through the gap 8, there is formed a structure in which the needle 6 is held by the first opposed part and is further held by the second opposed part.

The disposition described above results in a structure in which an armature unit is formed in which a magnetic flux flows alternately upward and downward between the upper and lower pole teeth in the gap between the upper pole teeth and the lower pole teeth of the opposed parts of the linear motor, which embodies the invention in this manner, and the needle 6 moves in relative motion through the gap.

Referring to FIG. 2, a supporting mechanism (on the armature side) 14 supports the needle 6 moving in relative motion toward the armature 3, and another supporting mechanism (on the needle side) 15 supports the needle 6 moving in relative motion toward the opposed direction of the armature 3. The needle 6, supported by the supporting mechanisms 14 and 15, moves in relative motion through the gap 8 as if passing a tunnel.

In the linear motor embodied in this manner, the armature 3 is provided with two series of pole teeth, upper and lower, and the needle 6 moves in relative motion between the upper pole teeth and the lower pole teeth. If the distances from the center of the needle 6 to the upper and lower pole teeth are equal, the suction force working between the needle 6 and the upper pole teeth and that working between the needle 6 and the lower pole teeth are equal and they work in mutually reverse directions, resulting in their mutual cancellation to reduce the total suction force to zero. As a result, the suction force between the needle 6 and the pole teeth of the armature 3 can be reduced to alleviate the loads on the supporting mechanisms 14 and 15.

FIG. 3 conceptually shows the flow of magnetic flux in the linear motor embodied in this way. When the armature coil 4 is excited, if the upper and lower pole teeth fitted to the magnetic pole 1 constitute an N pole, the upper and lower pole teeth fitted to the magnetic pole 2 will constitute an S pole. In this process, the magnetic flux flow from the upper pole teeth 11a of the magnetic pole 1 to the lower pole teeth 21b of the magnetic pole 2 and, similarly, the magnetic flux flow from the lower pole teeth 12b of the magnetic pole 1 to the upper pole teeth 22a of the magnetic pole 2, with the result that the flowing direction of the magnetic flux in the gap 8 between the upper pole face and the lower pole face is reversed at every pole pitch.

For this reason, the flow of the magnetic flux in the linear motor embodied here penetrates the permanent magnet N pole and S pole of the needle 6 to run from the upper pole teeth to the lower pole teeth, and penetrates the permanent magnet S pole and N pole of the needle 6 to run from the lower pole teeth to the upper pole teeth, with the result that the magnetic path of the magnetic circuit of the effective magnetic flux is shortened, the magnetic reluctance is reduced, the effective magnetic flux is increased, and the leaked magnetic flux is decreased.

Incidentally, in a conventional claw ball type linear motor, there is only one pole face, and the magnetic flux flows from the N pole teeth of the armature along the permanent magnet S pole and N pole of the needle to return to the S pole teeth of the armature. Therefore, the magnetic path of the magnetic circuit of the effective magnetic flux is correspondingly longer. As a result, the conventional claw ball type is greater in magnetic reluctance, and involves more of a leaked magnetic flux that directly flows from the N pole teeth of the armature to the S pole teeth of the adjoining armature without passing the permanent magnets of the needle.

For this reason, as compared with the conventional linear motor, a linear motor according to the present invention, even of the same size, can realize a greater thrust and braking force.

Next, with reference to FIGS. 4A and 4B and FIGS. 5A and 5B, examples of configuration of the permanent magnets arranged in the needle 6 will be described.

Figure 4A:
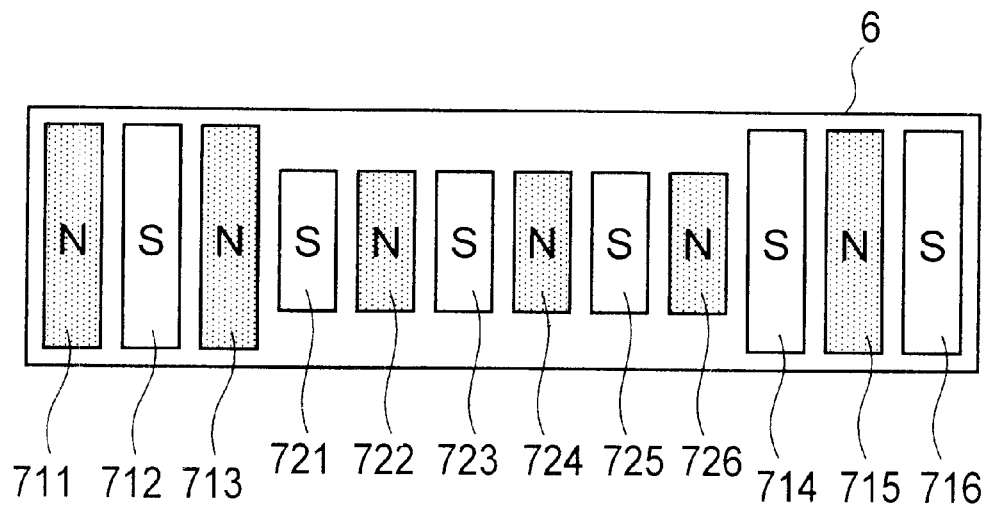
FIG. 4A is a schematic diagram illustrating a needle in the embodiment of the present invention, wherein a plurality of permanent magnets are arranged so that poles adjacent to the needle differ from each other.
Figure 4B:
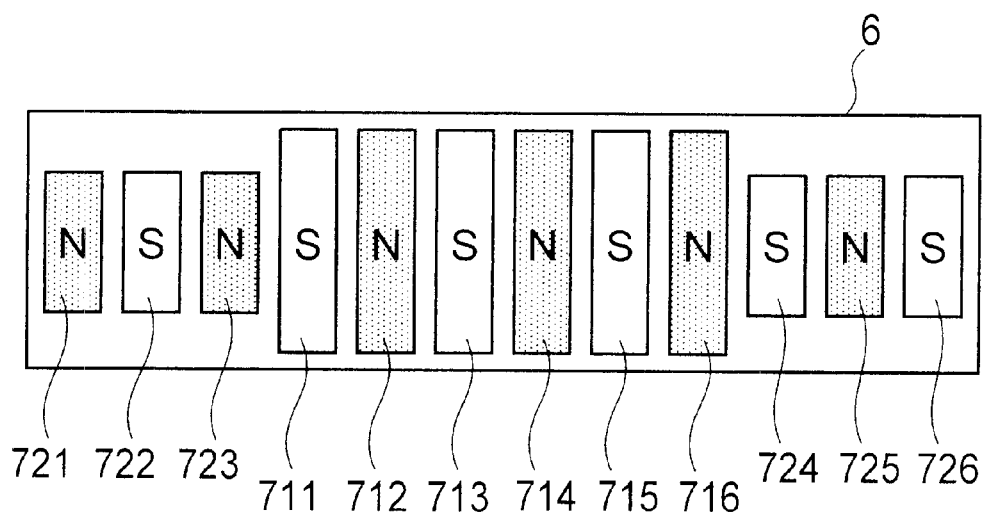
FIG. 4B is a schematic diagram illustrating a needle in the embodiment of the present invention, wherein a width of magnets toward the ends of the needle is narrowed.
Figure 4B:
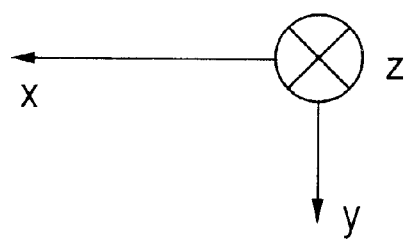

FIGS. 4A and 4B illustrate a case in which the width in the y axis direction of the permanent magnets arranged in the needle 6 varies from position to position. First, as shown in FIG. 4A, a plurality of permanent magnets 711 through 716 are arranged in the needle 6 so that every pole differs from the adjacent poles, and they are magnetized in the direction of the z axis in FIGS. 4A and 4B. FIG. 4A shows an example in which the width (in the y axis direction) of magnets near the center is reduced, while FIG. 4B shows a case in which the width (in the y axis direction) of magnets near the ends is reduced. As shown in FIGS. 4A and 4B, by varying the width of the permanent magnets 711 through 716 and 721 through 726 according to the position in the needle 6, the thrust and braking force generated in a given position in the needle 6 are varied. Thus, the thrust and braking force working on the needle 6 differ depending on whether a section in which the permanent magnets 7 of the needle 6 are wider is between the upper and lower pole teeth or a section in which the permanent magnets 7 of the needle 6 are narrower is between the upper and lower pole teeth. In this manner, where it is desired to reduce the thrust and braking force the width of the permanent magnets 7 of the needle 6 is set smaller and, conversely, the width of the permanent magnets 7 of the needle 6 is set greater where it is desired to increase the thrust and braking force. This enables the thrust and braking force to be variable.

Figure 5A:
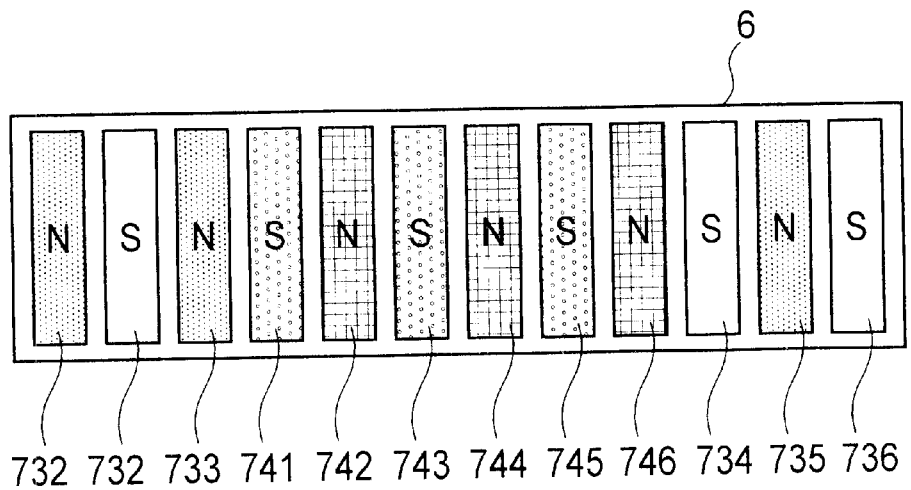
FIG. 5A is a schematic diagram illustrating a needle in another embodiment of the present invention, wherein neodymium magnets are used toward ends of the needle and ferrite magnets are used in a middle part of the needle.
Figure 5B:
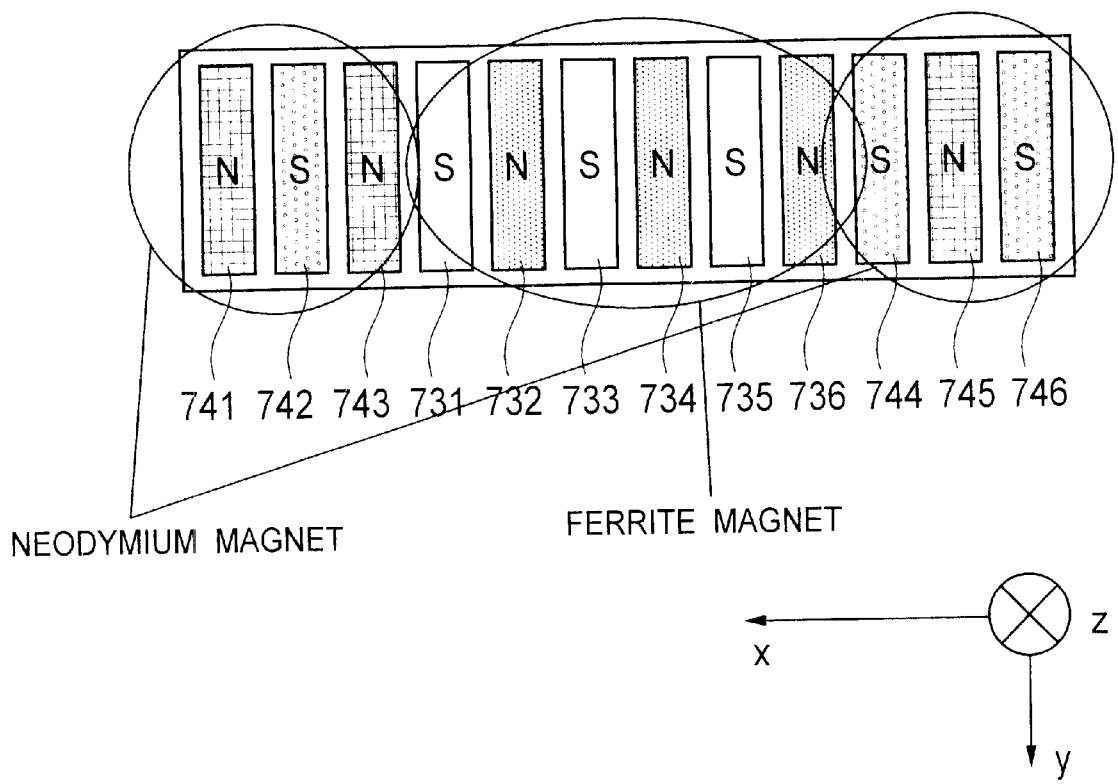
FIG. 5B is a schematic diagram illustrating a needle in still another embodiment of the present invention, wherein ferrite magnets are used toward the ends of the needle and neodymium magnets are used in the middle part of the needle.

FIGS. 5A and 5B illustrate examples in which the permanent magnets arranged in the needle 6 are made of different materials. The example in FIG. 5A uses neodymium magnets and ferrite magnets in combination with neodymium magnets being used toward the ends, and ferrite magnets being used in the middle part, of the needle 6. In the example in FIG. 5B, conversely, ferrite magnets are used toward the ends, and neodymium magnets are used in the middle part, of the needle 6. Since neodymium magnets and ferrite magnets are different magnetic substances, the magnetic forces they generate are different even though the magnetic flux density is the same in the upper and lower pole teeth. Thus, the use of different magnetic substances makes possible varying the thrust and braking force on the needle 6 from one section of the needle 6 to another.

While the foregoing description referred to one case in which the thrust and braking force working on the needle 6 is changed by varying the width in the y axis direction of the permanent magnets 7 arranged in the needle 6 and another in which magnets of different kinds are arranged, the same purpose can also be attained by setting the arrangements of the permanent magnets by combining different types of magnets with magnets varying in width. After all, ferrite magnets narrower in the y axis direction and neodymium magnets wider in the y axis direction can be arranged in combination.

Figure 6:
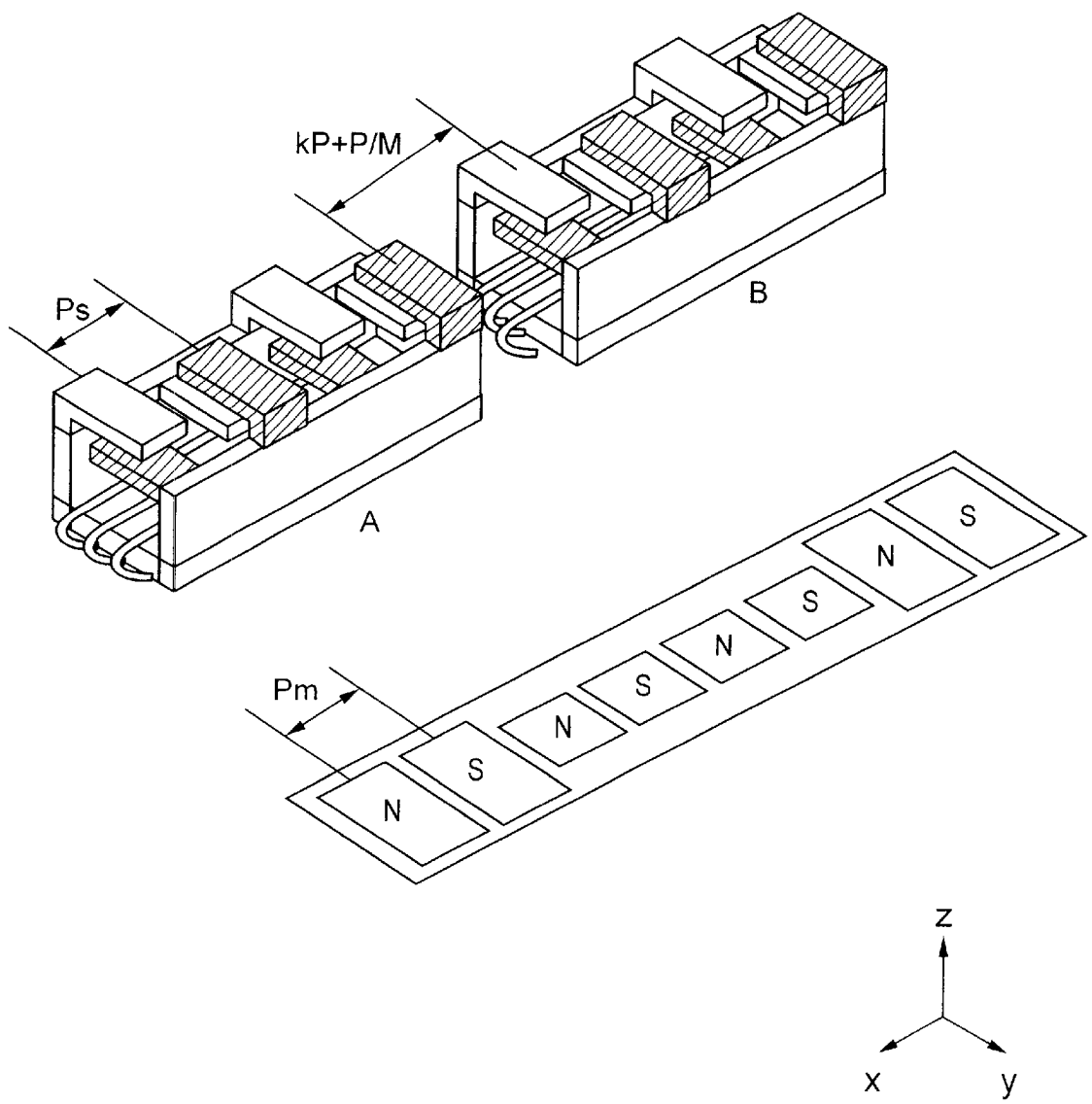
FIG. 6 illustrates a linear motor comprising two armature units according to the present invention arranged in series.

Next will be described a linear motor comprising a plurality of armature units of FIG. 1 arranged either in series or in parallel. FIG. 6 illustrates a linear motor comprising two armature units of FIG. 1 arranged in series.

Referring to FIG. 6, in general terms, an armature unit A and an armature unit B are arranged in series so that the pitch of the pole teeth a of the armature unit A and the pole teeth b of the adjacent armature unit B be (k×P=P/M){(k=0, 1, 2, . . . ), (M=2, 3, 4, . . . )}, where P is the pole pitch (the pole pitch P may be either the armature pole pitch Ps or the needle pole pitch Pm), and M, the number of phases of the motor. Thus in FIG. 6, k=1, M=2.

In the configuration of FIG. 6, armature pole pitch Ps and the needle pole pitch Pm may be either the same or different. If the armature pole pitch Ps and the needle pole pitch Pm are unequal, there will be an effect to reduce the thrust pulsation working between the permanent magnets 7 and the pole teeth.

In the needle 6, a plurality of permanent magnets 7 are arranged so that adjacent poles differ from each other and magnetized in the z axis direction of FIG. 2.

As illustrated in FIG. 2, the needle 6 is supported by the supporting mechanisms 14 and 15 in the gap 8 between the upper and lower pole faces of the armature unit A and the armature unit B and, as the armature coils 4 of the armature unit A and the armature unit B are alternately excited, the magnetic flux flows through the gap 8 between the upper pole face and the lower pole face in the direction which is reversed at every pole pitch, a thrust is generated by P/2, which is indispensable for shifting, and the needle 6 moves in relative motion.

By arranging two armature units in series in this manner, there is formed a linear motor in which the needle 6 moves in relative motion so as to pass the gap 8 between the upper pole face and the lower pole face of the armature units A and B.

In this configuration, as illustrated in FIG. 6, by varying the width in a y direction of the permanent magnets 7 arranged in the needle 6 according to the position in the needle, the thrust and braking force are enabled to be variable according to the section in the needle 6 even if the magnetic flux between the upper and lower pole teeth is constant, because the permanent magnets 7 arranged in the needle 6 are unequal in magnetic force.

While an instance in which permanent magnets 7 of the same type are varied in their width in the y direction according to the position in the needle 6 was described with reference to FIG. 6, it is also possible to use in combination magnets of different substances, such as neodymium magnets and ferrite magnets.

While an arrangement of two armature units in series was described with reference to FIG. 6, the same applies to an arrangement of a greater number of armature units in series as well.

Figure 7:
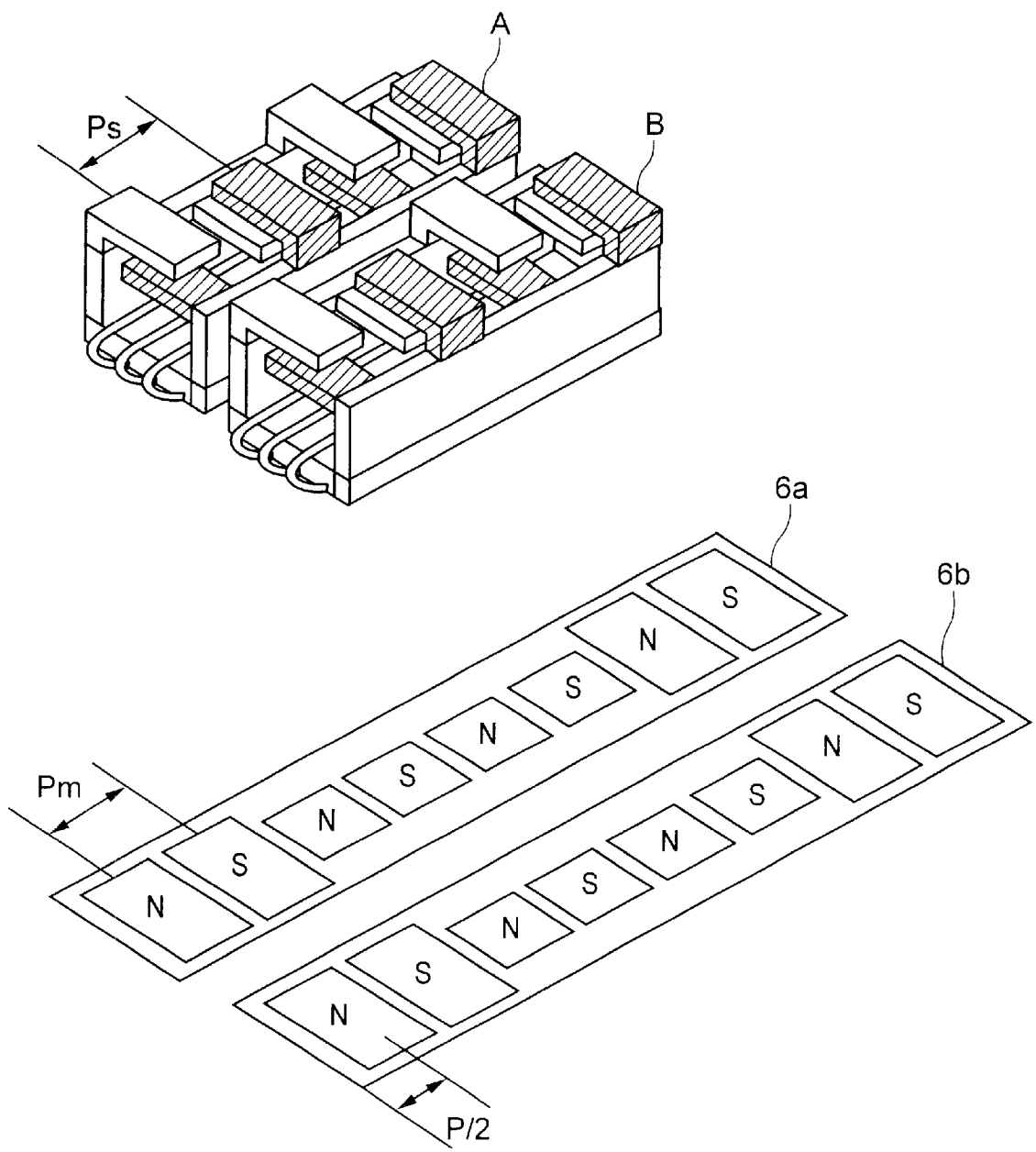
FIG. 7 illustrates a linear motor comprising two armature units according to the present invention arranged in parallel.

FIG. 7 illustrates a linear motor comprising two armature units of FIG. 1 arranged in parallel. Referring to FIG. 7, the armature unit A and the armature unit B are arranged together in parallel, and a plurality of permanent magnets 7 are arranged, poles differing from adjacent ones are arranged as needles, and a needle 6a and a needle 6b are formed in an integrated way. In this case, the needle 6a and the needle 6b are staggered by a P/2 pitch. In relative terms, alternatively, the needle 6a and the needle 6b may be aligned with the armature unit A and the armature unit B being staggered by a P/2 pitch.

Further, in the parallel arrangement of FIG. 7, similarly to the serial arrangement of FIG. 6, the armature pole pitch Ps and the needle pole pitch Pm may be either the same or different.

In the Same way as the arrangement of FIG. 6, the needle 6a and the needle 6b are supported by the supporting mechanisms 14 and 15 shown in FIG. 2 in the gap 8 between the upper and lower pole faces of the armature unit A and the armature unit B and, as the armature coils 4 of the armature unit A and the armature unit B are alternately excited, the magnetic flux flows through the gap 8 between the upper pole face and the lower pole face in the direction which is reversed at every pole pitch, and a thrust is generated by P/2, which is indispensable for shifting, and the needle 6 moves in relative motion.

By arranging two armature units in parallel and integrating the two needles, there is formed a linear motor in which the needle 6a and the needle 6b move in relative motion so as to pass the gap 8 between the upper pole face and the lower pole face of the armature units A and B.

In this configuration, as illustrated in FIG. 7, by varying the width in the y direction of the permanent magnets 7 arranged in the needles 6 according to the position in the needles, the thrust and braking force are enabled to be variable according to the section in the needles 6 even if the magnetic flux between the upper and lower pole teeth is constant, because the permanent magnets 7 arranged in the needles 6 are unequal in magnetic force.

While an instance in which permanent magnets 7 of the same type are varied in their width in the y direction according to the position in the needles 6 was described with reference to FIG. 7, it is also possible to use in combination magnets of different substances, such as neodymium magnets and ferrite magnets.

While an arrangement of two armature units in parallel and the integration of two needles was described with reference to FIG. 7, the same applies to the arrangement of a greater number of armature units in parallel and integrating a plurality of needles as well.

As hitherto described, when a plurality of armature units are to be arranged either in series or in parallel, if the armature units or the needles are arranged in an integrated way, so that the pitch of the pole teeth of either adjacent armature units or adjacent needles be (k×P+P/M){(k=1, 2, 3, . . . ), (M=2, 3, 4, . . . )}, where P is the pole pitch, and M, the number of phases of the motor, the armature units and the needles can move relative to each other.

Figure 8A:
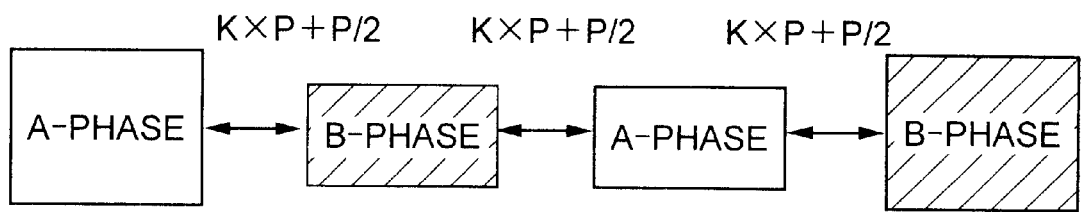
FIG. 8A is a schematic diagram of an arrangement of armature units in series in another embodiment of the present invention, illustrating an A-phase, B-phase, A-phase and B-phase arrangement of the armature units.
Figure 8B:
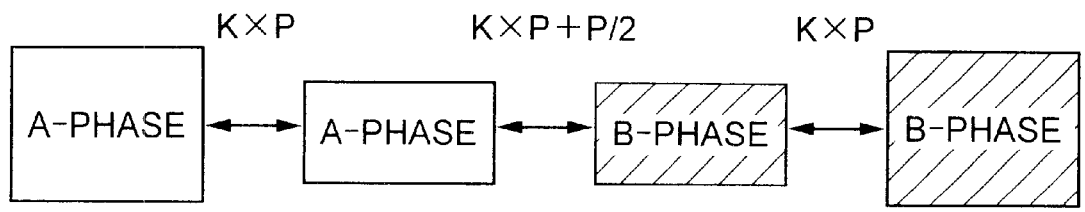
FIG. 8B is a schematic diagram of another arrangement of armature units in series in that other embodiment of the present invention, illustrating an A-phase, A-phase, B-phase and B-phase arrangement of the armature units.

FIGS. 8A and 8B schematically illustrate arrangements of armature units in series in another embodiment of the invention. FIGS. 8A and 8B show serial arrangements of a two-phase linear motor in which four armature units are disposed, each pair of armature units making up one phase, so that the pitch of the pole teeth a of mutually adjacent armature units of the same phase be (k×P){(k=1, 2, 3, . . . )} and the pitch of the pole teeth of mutually adjacent armature units of different phases be (k×P+P/M){(k=1, 2, 3, . . . ), (M=2, 3, 4, . . . )} (k, a number which can be freely chosen in a range wherein mutually adjacent armature units can be arranged; and M, the number of phases of the motor). FIG. 8A illustrates an A-phase, B-phase, A-phase and B-phase arrangement of the armature units, while FIG. 8B illustrates an A-phase, A-phase, B-phase and B-phase arrangement of the armature units.

By arranging many armature units to make up each phase as shown in FIGS. 8A and 8B, a linear motor generating a large thrust can be obtained. While FIGS. 8A and 8B illustrate a linear motor in which four armature units are arranged, with each pair of armature units constituting each phase, the same holds true with a greater number of armature units arranged in series, as well as with a plurality of armature units arranged in parallel and a plurality of needles being integrated.

Figure 9:
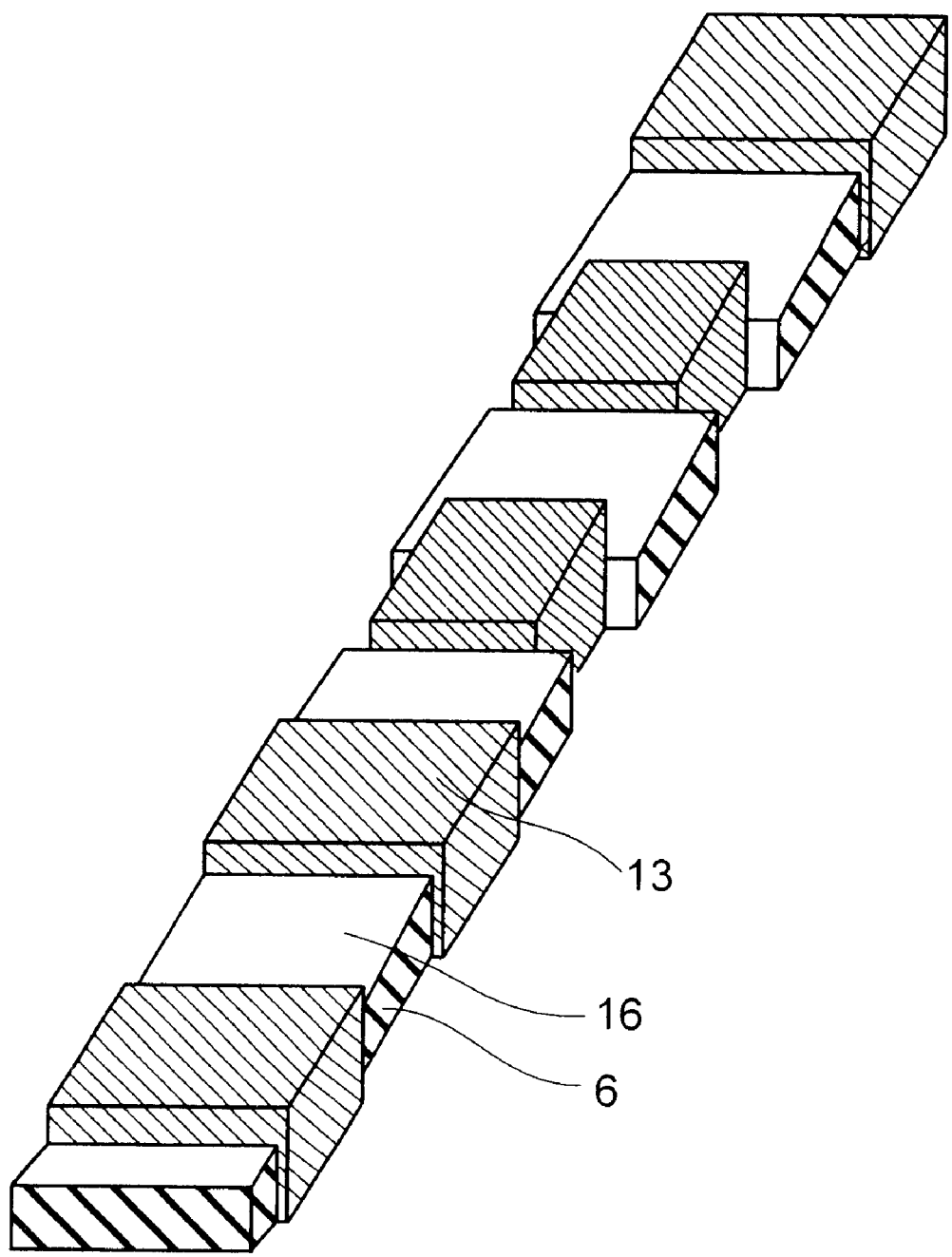
FIG. 9 schematically illustrates a needle in another embodiment of the present invention.

FIG. 9 schematically illustrates a needle embodying the present invention in another way. While the needle 6 shown in FIG. 1 has a plurality of permanent magnets 7 so that mutually adjacent magnetic poles be different, a needle 6 shown in FIG. 9 has a planar plate of ferromagnetic substance instead of the permanent magnets 7, and on both faces of this ferromagnetic substance are provided convex pole teeth 13 at constant intervals.

The convex pole teeth 13 on both faces of the planar ferromagnetic substance causes the magnetic reluctance between them and the pole faces of the armatures to vary. Thus, the magnetic reluctance between the convex pole teeth 13 and the pole faces of the armatures is smaller than that between planar parts 16 of the ferromagnetic substance and the pole faces of the armatures. The moving freedom of the needle is enhanced by utilizing this difference in magnetic reluctance.

It is also possible to make the convex pole teeth 13 of a ferromagnetic substance and providing the planar parts 16 with permanent magnets to form a composite type needle. In another possible combination, the convex pole teeth 13 are made of a ferromagnetic substance and the planar parts 16, of a non-magnetic substance.

It is also possible, as shown in FIG. 9, to make the thrust and braking force variable according to the position in the needle 6 by providing pole teeth 13 of different sizes.

As described above, the magnetic path of the magnetic circuit of the effective magnetic flux is shortened, and the leaked magnetic flux from the pole teeth is decreased, enabling the thrust and braking force to be greater and variable according to the position in the needle.

Furthermore, the total suction force working vertically to the needle between the needle and the upper pole faces of the armatures can be cancelled to zero. As a result, the suction force between the needle and the pole faces of the armatures can be reduced to alleviate the loads on the supporting mechanisms.

The present invention facilitates generation of a greater thrust and braking force in a specific section or sections than elsewhere.

While we have shown and described several embodiments in accordance with our invention, it should be understood that the disclosed embodiments are susceptable of changes and modifications without departing from the scope of the invention. Therefore, we do not intend to be bound by the details shown and described herein, but intend to cover all such changes and modifications as fall within the ambit of the appended claims.

What is claimed is:

1. A linear motor comprising an armature formed of magnetic material having two poles, a coil wound on said armature and a planar part having permanent magnets, said linear motor further comprising:

a first magnetic pole tooth train magnetically coupled to one magnetic pole of said armature and disposed in a first level and a second level; and a second magnetic pole tooth train magnetically coupled to an other magnetic pole of said armature and disposed in a first level and a second level;

wherein said armature or said planer part is movable, magnetic pole teeth in said first level of said first magnetic pole tooth train and magnetic pole teeth in said first level of said second magnetic pole tooth train are disposed alternately according to a movable direction of said armature or said planar part, said planer part is disposed between magnetic pole teeth in said first level and magnetic pole teeth in said second level, and a distribution of magnetism of said planer part varies according to a position in the movable direction of said armature or said planer part.

2. A linear motor according to claim 1, wherein a length of the permanent magnets in a width direction differs according to a position in a movable direction in the movable direction of said armature or said planer part.

3. A linear motor according to claim 1, wherein said permanent magnets have different magnetic characteristics and are arranged according to a position in the movable direction of said armature or said planer part.

4. A linear motor comprising a first member and a second member, wherein said first member includes a first core part having first opposite portions opposed to each other through a first gap and a second core part having second opposite portions opposed to each other through a second gap, said first core part and said second core part include a common coil, the magnetic polarity of said first opposite portions are different and the magnetic polarity of said second opposite portions are different, said first core and said second core are disposed alternately, said second member is disposed in said first gap and said second gap, and said first member or said second member is movable, and wherein a distribution of magnetism of said second member varies according to a position in the movable direction of said first member or said second member.

5. A linear motor according to claim 4, wherein said second member has permanent magnets, wherein a length of the permanent magnets in a width direction differs according to a position in a movable direction in the movable direction of said armature or said planer part.

6. A linear motor according to claim 4, wherein said second member has permanent magnets with different magnetic characteristics, and wherein said permanent magnets with different magnetic characteristics are arranged according to a position in the movable direction of said armature or said planer part.

* * * * *